INVENTORS.
Stephen V. T. Marshall
Arnett L. Bird

BY *Robert B. Ingraham*

AGENT

United States Patent Office 3,011,212
Patented Dec. 5, 1961

3,011,212
SHAPING THERMOPLASTIC RESINOUS SHEETS
Stephen V. T. Marshall and Arnett L. Bird, Midland, Mich., assignors to The Dow Chemical Company, Midland, Mich., a corporation of Delaware
Filed Dec. 3, 1959, Ser. No. 857,167
6 Claims. (Cl. 18—19)

This invention relates to a method and apparatus for forming thermoplastic, resinous, sheet material. More particularly, it relates to a method and apparatus for the preparation of containers and like objects having a rolled edge.

Conventional manufacture of thermoplastic, resinous sheets into shaped objects by means of vacuum forming frequently results in a product having angular edges which are substantially normal to the direction of the draw. Such edges result from severing the formed objects from the parent sheet. Containers, for example, cups and the like, may then be trimmed or cut from the parent sheet resulting in an edge facing vertically upward or downward, depending on the specific configuration of the formed sheet at the cup rim. Cracking of the cup during trimming of the container frequently occurs and results in both waste material and a substantial loss of production.

Angular edges are generally found to be unsatisfactory for applications such as drinking. Further, they present a serious hazard if the container has been fabricated from a brittle material, wherein possibility of cracking and obtaining dangerous edges in the cup is rather great. The sheared edge resulting from such a trimming operation usually has an angular configuration. This, too, may give rise to the mentioned possibility of being actually unsafe to employ. Besides, a cup or the like container with an angular edge is, also, generally considered undesirable as a drinking vessel because of the disagreeable sensation produced when such a sharp edge is brought into contact with the lips of the person drinking therefrom.

It would be advantageous if a method and apparatus were available which would permit the shaping of a container from a thermoplastic resinous sheet by vacuum forming which would simultaneously form a rolled edge on the container and shear the container from the parent sheet in a single operation.

It would, also, be advantageous if such a method and apparatus would employ simple equipment.

It would be further advantageous if such a method and apparatus of preparing the rolled edge would permit a very rapid forming cycle.

These advantages and cognate benefits may be obtained by use of an apparatus for the forming of thermoplastic, resinous, sheet material by vacuum forming, which apparatus comprises: a mold or form having a shearing edge positioned downwardly and outwardly from the peripheral edge of said form; a mating die in cooperative combination with said form, said mating die comprising a shearing edge, said shearing edge being operatively engageable with said form shearing edge; an inwardly facing recess adjacent to said die shearing edge, said recess having a generally arcuate cross section and being in communication with a fluid escape passageway in said die.

The method of the invention, which may advantageously be followed by use of the contemplated apparatus, permits thermoplastic, resinous, sheet material to be vacuum formed with a rolled edge which method comprises: first forming the major portion of the desired object; then bending downwardly the portion of said sheet about the periphery of said major portion of the desired object, shearing said sheet about the periphery of said major portion of said object and applying vacuum to said downwardly bent portion of the periphery of said object; then drawing outwardly said downwardly bent portion of the periphery into a configuration having a generally arcuate cross section.

Other objects and advantages of the present invention will become apparent in the following specification and description, taken in connection with the accompanying drawing, wherein.

Figure 1:
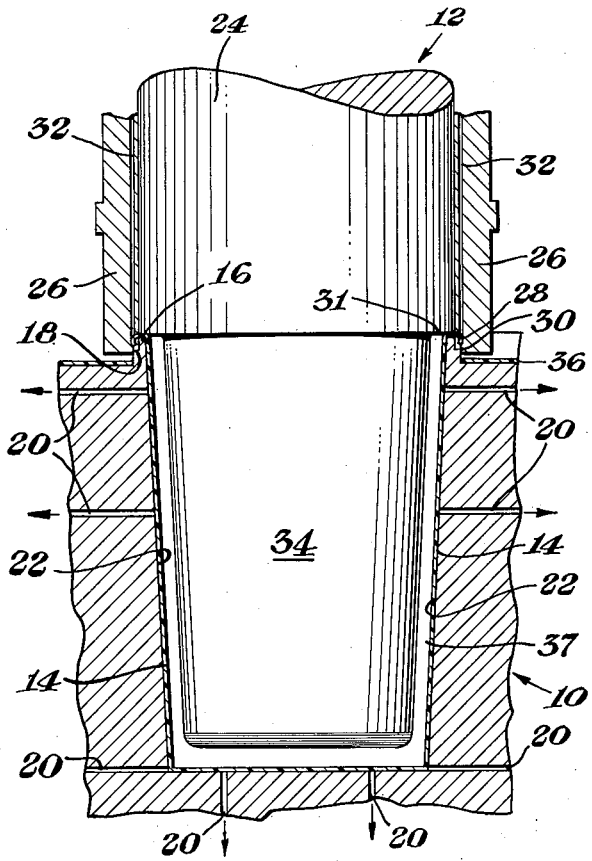
FIGURE 1 is a cross-sectional view of a mold, a die and a container that has been formed by practice of the present invention.

In FIGURE 1 there is illustrated a cross-sectional view of a mold or form, die and a cup being fabricated in accordance with the invention. The form is indicated generally by the reference number 10, the die by the reference number 12 and the container or cup by the reference number 14. The mold 10 has an upper lip or edge 16 and a shearing edge 18 disposed about the periphery of the form 10. The form 10 is provided with gas escape channels or passageways 20 that are distributed about and communicate with the surface 22 which, in turn, is in contact with the formed cup or container 14.

The die 12 is made up of two major parts. One is the body 24. The other is the outer moveable shear ring 26.

The shear ring 26 has a generally annular inwardly facing groove or recess 28 adjacent to the die shearing edge 30. A vent or gas escape passageway 32 is provided within the moveable shear ring 26. The die 12 is provided with clamping shoulder 31 and plug 34. In the closed position, a clearance designated by the reference number 37 is provided between the plug 34 and the wall 22 of the form 10.

Figure 2:
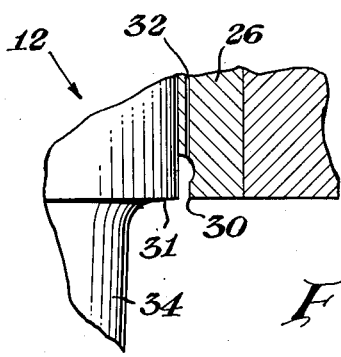
FIGURE 2 is a cross-sectional view of one edge of a die for an apparatus in accordance with the invention.

FIGURE 2 is a cross-sectional view of one edge of the die 12 in the open position showing shoulder 31, the lower portion of shear ring 26, the annular inwardly facing recess 28, the die shearing edge 30, and the vent passageway 32.

Figure 3:
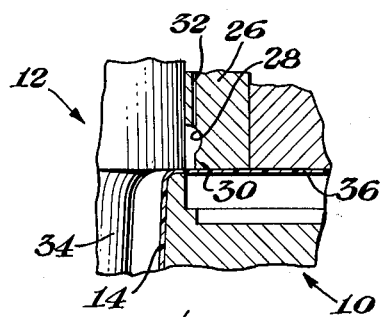
FIGURE 3 is a cross-sectional view of one edge of the die in contact with the upper edge of the mold.

FIGURE 3 shows a cross-sectional view of one edge of the die 12 and form 10 in a partly closed position having a softened thermoplastic, resinous sheet 36 clamped therebetween.

Figure 4:
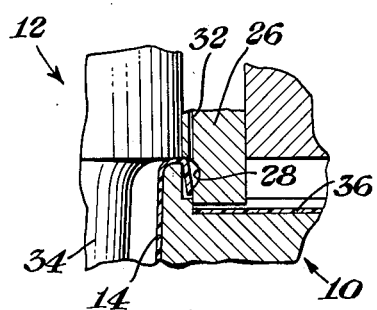
FIGURE 4 illustrates the position of elements and the configuration of an article being formed after the shearing step when practicing the present invention.
Figure 5:
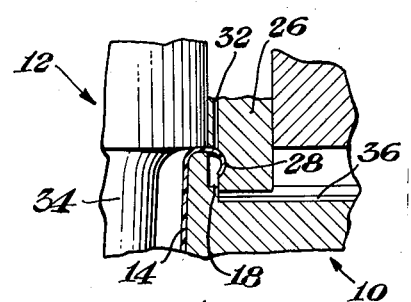
FIGURE 5 illustrates the final step in practice of the invention of forming the rolled edge, particularly when using the presently contemplated apparatus.

FIGURE 4 is a view that is similar to that of FIGURE 3, excepting that it illustrates the shear ring 26 advanced to the full closed position. The sheet 36 is shown severed from the cup 14.

In practice of the invention, a thermoplastic sheet material 36 is supported above the periphery of the form 10 and the outer edges of the sheet (not shown) are in sealing engagement with the rim of the lower pressure chamber (not shown). The sheet 36 is heated until it may be readily deformed by the application of vacuum. At this time the die 12 is moved toward the form 10. A vacuum is applied to passageways 20 to form the main body of the cup 14. The application of vacuum bends the sheet until contact is established by the shearing edge 30 with the sheet 36, and as the die 12 is advanced downwardly, the sheet 36 is severed by shear ring 26 and shearing edge 30. A vacuum is applied to recess 28, whereupon the soft thermoplastic sheet 36 is drawn into contiguity with the face of the recess 28. The formed cup 14 is cooled. The die 12 is then withdrawn from the form 10; the cup 14 is carried and supported by the generally arcuate surface of the inwardly facing groove or recess 28.

After the die 12 has been withdrawn from the mold 10, the cup 14 may be readily removed by means of gas, other fluid pressure applied to the inside of the container 14 or withdrawing shear ring 26 to the position shown in FIGURE 2. Alternately, the cup 14 may be removed by mechanically misaligning its axial center line from the center line of the die 12.

Forms applicable to the apparatus and method of the invention are those customarily employed in vacuum forming operations with the addition of shearing edge 30. Such molds are generally fabricated from wood, metal, and mixtures or compositions containing various synthetic resins and fillers. It is usually advantageous to construct a shearing edge from conventional metals, such as high carbon steel, high speed tool steel, and the like. However, if relatively long service life is not required of a particular mold, as in the case of a limited production run, the shearing edge may advantageously be constructed or fabricated from low carbon steel. For example, if a small number of square or rectangular or even irregular shaped containers is to be made, a shearing edge of such low carbon steel as conventional "key stock" may be employed for both mold and die.

Generally, it is advantageous to provide a clearance between the shearing edges of the die and the shearing edge of the form of from about 0.1 to 0.25 of the thickness of the sheet being sheared. Such clearance will be dependent upon the characteristics of the particular sheet employed if maximum service is to be obtained from a shearing arrangement.

If deep-drawn containers are to be formed, it is frequently advantageous to equip the die with a plug 34 which generally approximates the size and shape of the inside of the finished container being made. Generally a more uniform wall thickness of the finished article may be obtained when the plug 34 is employed than if a plug is omitted.

It is generally advantageous to allow a clearance between the wall of the plug 34 and the wall 22 of the mold 10 of at least three times the thickness of the original sheet being formed.

A wide range of absolute pressures (usually below about 14.7 pounds per square inch, i.e., atmospheric pressure, in vacuum forming operations) may be employed in the practice of the invention. A choice of such absolute pressures will be dependent upon the formability of the heated sheets 36 and on the fidelity of reproduction of the form surface 22 desired. Thus, if sharp detail is required, generally lower pressures within the forming cavity are necessary to reproduce such detail in the surface of the sheet. On the other hand, if a smooth mold is employed having gently curving surfaces, higher pressures are satisfactory.

The invention is particularly adapted to be employed in conjunction with conventional vacuum forming techniques wherein the maximum pressure to be applied to the sheet will not exceed atmospheric pressure. However, greater forming force may be obtained by applying vacuum to the chamber containing the mold and a super-atmospheric pressure to the opposite side of the sheet.

Any thermoplastic sheet materials may be employed in the method of the invention provided a working range of about 5° C. exists. By "working range" is meant the temperature range over which the thermoplastic sheet is soft and relatively easily deformed by a mechanical force of about 15 pounds per square inch. Thermoplastic sheet materials which may be employed in the method and apparatus of the invention may be any of a great variety of satisfactory materials, such as various alkenyl aromatic resins, including thermoplastic polymers and copolymers of styrene, fluorostyrene, α-methyl styrene, vinyl chloride, vinylidene chloride, esters of acrylic acid, acrylic and methacrylic acid, acrylonitrile, and so forth. Thermoplastic materials such as ethyl cellulose, cellulose acetate, cellulose butyrate, and similar materials are also satisfactory for use in connection with practice of the present invention.

As has been indicated, the method and apparatus of the invention may advantageously be practiced in the course of following conventional vacuum forming techniques, such as plug-assist forming, draw forming, drape forming, air slip forming, vacuum snap-back forming, and the like.

While the invention has been described with reference to particular embodiments, it is contemplated that most modifications thereof may be made without departing from its spirit and scope, particularly as defined in the hereto appended claims.

What is claimed is:

1. An apparatus for the vacuum forming of thermoplastic sheet material, which apparatus comprises: a form having a shearing edge positioned downwardly and outwardly from the peripheral edge of said form; a mating die in cooperative combination with said form, said mating die comprising a shearing edge, said shearing edge being operatively engageable with said form shearing edge; an inwardly facing recess adjacent to said die shearing edge, said recess having a generally arcuate cross section and being in communication with a fluid escape passageway in said die.

2. The apparatus of claim 1, wherein said peripheral edge of said form is rectangular.

3. The apparatus of claim 1, wherein said peripheral edge of said form is circular.

4. The apparatus of claim 1 wherein said form and said die are adapted to form a cup.

5. A method for forming a rolled edge on a sheet of thermoplastic sheet material, which method comprises first forming the major portion of the desired object; then bending downwardly the portion of said sheet about the periphery of said major portion of the desired object, shearing said sheet about the periphery of said major portion of said object and applying vacuum to said downwardly bent portion of the periphery of said object and drawing outwardly said downwardly bent portion of the periphery into a configuration having a generally arcuate cross section.

6. The method of claim 5, wherein said major portion of said desired object is vacuum formed.

References Cited in the file of this patent

UNITED STATES PATENTS

| | | |
|---|---|---|
| 2,210,509 | Strauch | Aug. 6, 1940 |
| 2,749,572 | Nowak | June 12, 1956 |
| 2,876,498 | Nason | Mar. 10, 1959 |
| 2,891,280 | Politis | June 23, 1959 |